(12) United States Patent
Noh

(10) Patent No.: US 8,600,051 B2
(45) Date of Patent: Dec. 3, 2013

(54) SYSTEM AND METHOD FOR QUANTUM CRYPTOGRAPHY

(75) Inventor: Tae-Gon Noh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 402 days.

(21) Appl. No.: 12/994,090

(22) PCT Filed: Sep. 24, 2008

(86) PCT No.: PCT/KR2008/005670
§ 371 (c)(1),
(2), (4) Date: Nov. 22, 2010

(87) PCT Pub. No.: WO2009/145392
PCT Pub. Date: Dec. 3, 2009

(65) Prior Publication Data
US 2011/0075839 A1    Mar. 31, 2011

(30) Foreign Application Priority Data
May 30, 2008   (KR) .................. 10-2008-0051027

(51) Int. Cl.
*H04L 29/06*   (2006.01)
(52) U.S. Cl.
USPC ........................................................ 380/44
(58) Field of Classification Search
USPC ......................................................... 380/44
See application file for complete search history.

(56) References Cited

U.S. PATENT DOCUMENTS

| | | | |
|---|---|---|---|
| 5,307,410 A * | 4/1994 | Bennett .................. | 380/256 |
| 5,850,441 A * | 12/1998 | Townsend et al. .......... | 380/283 |
| 6,438,234 B1 | 8/2002 | Gisin et al. | |
| 7,333,611 B1 * | 2/2008 | Yuen et al. .................. | 380/256 |
| 7,346,166 B2 * | 3/2008 | Inoue et al. ................. | 380/263 |
| 7,649,996 B2 | 1/2010 | Nishioka et al. | |
| 7,697,693 B1 * | 4/2010 | Elliott .......................... | 380/278 |
| 8,175,273 B2 * | 5/2012 | Kawamoto et al. ........... | 380/263 |
| 2005/0078827 A1 | 4/2005 | Tajima | |
| 2005/0094818 A1 * | 5/2005 | Inoue et al. ................. | 380/278 |
| 2005/0157875 A1 | 7/2005 | Nishioka et al. | |
| 2006/0062392 A1 * | 3/2006 | Lee et al. ...................... | 380/278 |
| 2006/0083376 A1 * | 4/2006 | Kawamoto et al. .......... | 380/256 |
| 2007/0076884 A1 | 4/2007 | Wellbrock et al. | |
| 2007/0248362 A1 | 10/2007 | Tanaka et al. | |

(Continued)

FOREIGN PATENT DOCUMENTS

WO   WO 2004/047359 A1   6/2004

OTHER PUBLICATIONS

"Quantum Cryptography Based on Orthogonal States," Goldenberg et al., 1995.*

(Continued)

*Primary Examiner* — Oscar Louie

(57) ABSTRACT

Provided are a system and a method for quantum cryptography. The method includes generating the same quantum cryptography key in a transmitter and a receiver by measuring a composite-quantum-system made of a plurality of sub-quantum-systems in each of the transmitter and the receiver connected to each other through a quantum channel, wherein a part of the sub-quantum-systems is confined within the transmitter in order not to expose the entire composite-quantum-system to an outside of the transmitter and the composite-quantum-system cannot be determined without disturbing the composite-quantum-system at the outside of the transmitter.

27 Claims, 1 Drawing Sheet

(56) References Cited

U.S. PATENT DOCUMENTS

2008/0013738 A1 1/2008 Tajima et al.
2008/0260393 A1 10/2008 Youn et al.
2009/0147955 A1* 6/2009 Kim et al. .................... 380/256

OTHER PUBLICATIONS

"What is quantum cryptography?", RSA Laboratories, Section 7.18, Mar. 3, 2007.*
Charles H. Bennett et al., "Quantum Cryptography: Public key distribution and coin tossing", Proceedings of IEEE International Conference on Computers, Systems and Signal Processing, Dec. 1984, pp. 175-179, Bangalore, India.
Nicolas Gisin et al., "Quantum Cryptography", Reviews of Modern Physics, 2002, pp. 145-195, vol. 74, pp. 145-195, The American Physical Society.
Dagmar Bruβ, "Optimal Eavesdropping in Quantum Cryptography with Six States", Phys. Rev. Letter, 1998, pp. 3018-3021, vol. 81, No. 14, The American Physical Society.
International Search Report for PCT/KR2008/005670 filed on Sep. 24, 2008.
Written Opinion of the International Searching Authority for PCT/KR2008/005670 filed on Sep. 24, 2008.

* cited by examiner

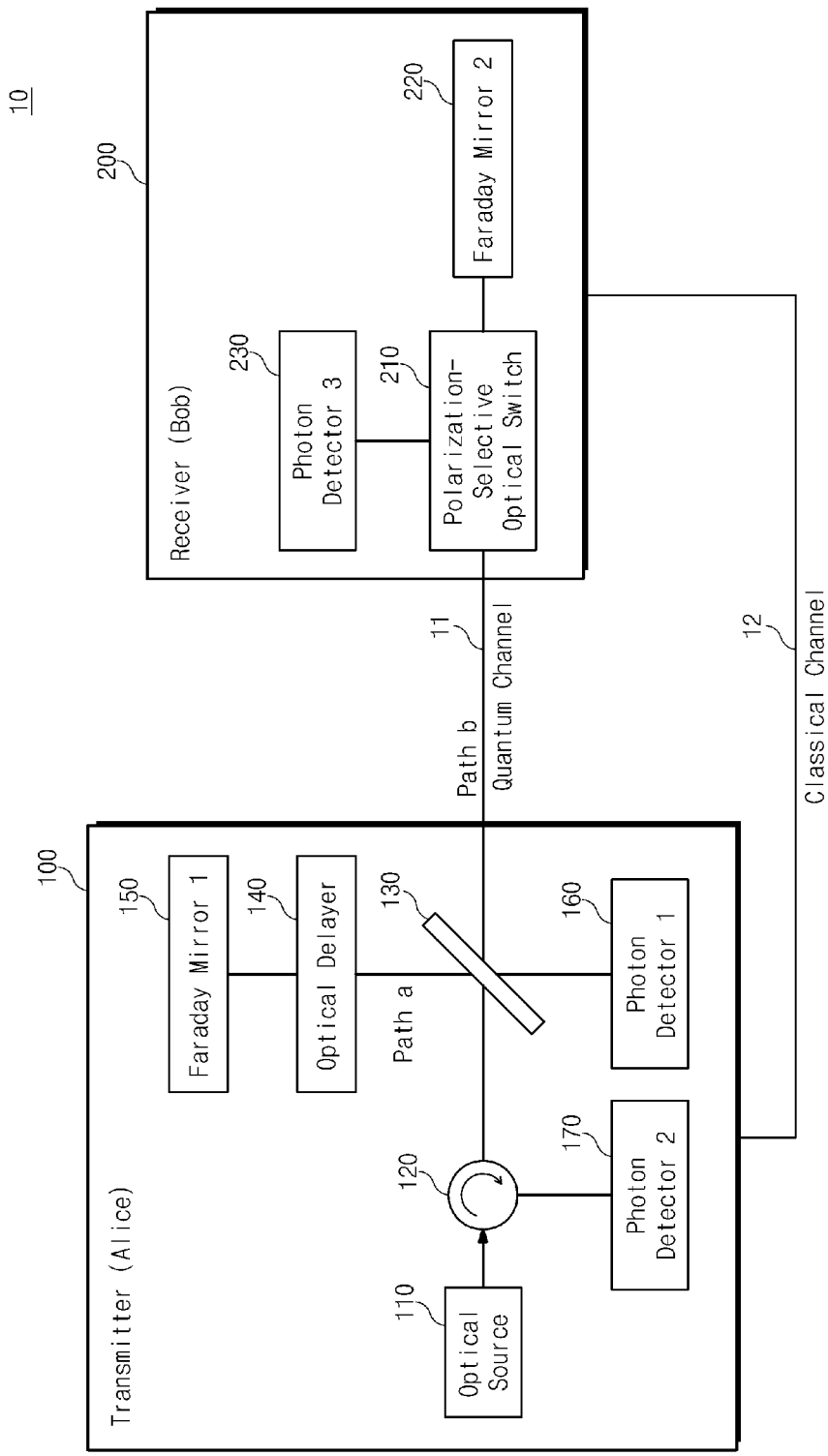

SYSTEM AND METHOD FOR QUANTUM CRYPTOGRAPHY

TECHNICAL FIELD

The present invention disclosed herein relates to a quantum cryptography system and a distribution method of a quantum cryptography key.

BACKGROUND ART

In recent, as wire/wireless communication technology is drastically developed and various communication services are extensively used, security programs of communication networks become a very important issue. In terms of protections for confidential and personal information related to nations, businesses, and finances, the importance of communication network security becomes gradually increased. The latest most remarkable quantum cryptography method for resolving security limitations for various communications guarantees its stability by a theory of quantum mechanics, i.e., the fundamental truth of nature. Therefore, this method is a kind of a communication security method for making packet tapping and monitoring absolutely impossible. That is, the quantum cryptography method is a method for absolutely safely distributing a secret key for encrypting and decrypting the transmitted data between a transmitter and receiver based on a law of quantum physics such as no-cloning theorem. Additionally, the quantum cryptography technology is well known as quantum key distribution (QKD) technology.

A review paper <<Quantum Cryptography>>, Rev, Mod. Phyx. Vol. 74, pp. 145-195 (2002) published in 2002 by N. Gisin, G. Ribordy, W. Tittel, H. Zbinden, et al. describes a typical quantum cryptography or quantum key distribution method in detail. According to this review paper, the generally well known quantum cryptography or quantum key distribution method includes BB84, B92, and EPR protocol. Typically, a paper <<Quantum Cryptography: Public key distribution and coin tossing>>, Proc. IEEE Int. Conf. on Computers, Systems and Signal Processing, Bangalore, India, pp. 175-179 (IEEE, New York, 1984) published in 1984 by Charles Bennettt and Gilles Brassard discloses a method known as a BB84 protocol. This method uses four quantum states (e.g., a polarization state of a photon such as 0° 90° 45° and 135° constituting two bases. That is, a transmitter Alice randomly selects one of two bases, and also randomly selects one of two quantum states (one bit value of a secret key), i.e., 0 or 1 of the selected basis, and then transmits it to the receiver Bob through a quantum channel. For instance, consider the case where (0° and 90°) basis and (45° and 135°) basis, i.e., a polarization state of a single photon, are used. And suppose that 0° and 45° represent a bit value 0, and 90° and 135° represent a bit value 1. Then, if the basis that the transmitter Alice randomly selects and the bit value that the transmitter Alice randomly selects are (0° and 90°) basis and 1, respectively, the transmitter Alice transmits a single photon with polarization state of 90° to the receiver Bob through the quantum channel. The receiver Bob receiving the single photon randomly selects one of two bases and also measures a quantum state of the received single photon through the selected basis. After the receiver Bob finishes measurement, the transmitter Alice and the receiver Bob announce the basis that they select at random to each other through a classical channel. Here, if the basis that the transmitter Alice selects and the basis that receiver Bob are the same, because the result that the receiver Bob measures is identical to a quantum state that the transmitter Alice randomly selects, two users Alice and Bob have the same bit value. A bit string including bit values extracted when the transmitter Alice and the transmitter Bob select the same basis by repeating the above processes is also called as a sifted key. The sifted key is finally used as a secret key after a post-processing procedure such as error correction and privacy amplification. If an eavesdropper tries to eavesdrop in the middle of communication, errors occur in the sifted key that two users Alice and Bob obtain based on the fundamental principle of quantum mechanics. The transmitter Alice and the receiver Bob announce a portion of the sifted key such that an error ratio is calculated to determine whether there is an eavesdropper or not.

However, these quantum key distribution methods may expose a part of a secret cryptography key to the eavesdropper Eve, due to noise of a quantum channel or each of imperfect components constituting a system during communication. Accordingly, to guarantee the absolute security of the quantum cryptography key distribution method, analysis research for limiting various tapping methods that an eavesdropper can try and an amount of information that an eavesdropper can obtain are under development.

For example, because there is no ideal single photon source currently, to actually realize a quantum key distribution method such as the BB84 protocol, weak coherent light (WCL) pulse is widely used. In this case, there is possibility that a multi-photon pulses not in a single photon state may be transmitted through a quantum channel. Additionally, the physically realized quantum channel has a loss actually. The eavesdropper may eavesdrop using actual network imperfection during communication. That is, the eavesdropper performs quantum non-demolition measurement (QND) on an optical pulse transmitted through a quantum channel thereby determining the number of photons without giving disturbance to a quantum state of a photon.

If the number of photons is 1, the eavesdropper discards the photon. If the number of photons is more than 2, the eavesdropper separates the photons and stores a portion of the photons. The remaining photons are transmitted to the receiver Bob. At this point, the eavesdropper replaces a portion or an entire of the quantum channel with a quantum channel having no loss, and appropriately controls the number of photons to be stored being separated from when a photon is discarded.

Thus, the transmitter Alice and the receiver Bob may not notice the existence of the eavesdropper Eve. After the transmitter Alice and the receiver Bob performs basis comparison through a classical channel, the eavesdropper performs appropriate quantum measurement on the stored photons based on collected information from the classical channel, thereby safely obtaining information for a secret key without detection.

This eavesdropping method is called a photon number splitting (PNS) attack. As the loss of a quantum channel increases, the probability that the PNS attack becomes successful increases. Therefore, the distance of a quantum channel where a quantum cryptography key can be safely distributed is limited. Typical quantum cryptography methods such as the BB84 protocol are vulnerable for this PNS attack such that a distance through which the secret key can be safely transmitted is limited.

A coherent attack known as the most general and comprehensive method among various eavesdropping methods that the eavesdropper can try proceeds as follows. After preparing a probe for eavesdropping, the eavesdropper let interacts the probe with photons (transmitted through a quantum channel), and then stores certain information for quantum state of photons as a quantum state of the probe based on a result of the interaction.

When the transmitted Alice and the receiver Bob complete all of a public discussion process such as base comparison, error correction and secret amplification through a classical channel, the eavesdropper performs an appropriate measurement on its own probe based on information collected through the public classical channel in order to obtain the maximum information about a cryptography key within a range that does not violate a rule of quantum mechanics.

With respect to this coherent attack, the above-mentioned quantum cryptography key distribution methods load a secret key into a quantum state of a photon, and then actually transmit the photon through a quantum channel, such that the eavesdropper can always access the photon. That is, there is a weak point in that the eavesdropper can always access the entire quantum states of a single photon.

On the other hand, an operation for confirming a quantum channel is commonly required first for the eavesdropper to try to eavesdrop about a cryptography key value. At this point, because the typical quantum cryptography key distribution methods actually transmit a photon through a quantum channel as mentioned above, the eavesdropper can in principle safely find out the quantum channel without being detected.

That is, a state where a photon exist and a vacuum state where a photon does not exist are orthogonal to each other. According to quantum mechanics, two orthogonal quantum states can be distinguished from each other without causing any disturbance. The typical quantum cryptography key distribution methods have a limitation in that an eavesdropper can identify a quantum channel without being detected.

DISCLOSURE OF INVENTION

Technical Problem

The present invention provides a quantum cryptography system capable of effectively blocking tapping attempt of an eavesdropper.

The present invention also provides a quantum cryptography system capable of preventing an eavesdropper from accessing a quantum channel.

The present invention also provides a quantum cryptography key distribution method capable of effectively blocking tapping attempt of an eavesdropper.

Technical Solution

Embodiments of the present invention provide distribution methods of a quantum cryptography key including: generating the same quantum cryptography key in a transmitter and a receiver by measuring a composite-quantum-system made of a plurality of sub-quantum-systems in each of the transmitter and the receiver connected to each other through a quantum channel, wherein a part of the sub-quantum-systems is confined within the transmitter in order not to expose the entire composite-quantum-system to an outside of the transmitter and the composite-quantum-system cannot be determined without disturbing the composite-quantum-system at the outside of the transmitter.

In even other embodiments, an actual path of a quantum used for constituting the composite-quantum-system and generating the quantum cryptography key is confined to an inside of the transmitter.

In yet other embodiments, the composite-quantum-system has one quantum state selected randomly among more than two quantum states, and each of the selected quantum states is used for generating the quantum cryptography key.

In further embodiments, the composite-quantum-system has one quantum state selected randomly among orthogonal quantum states.

In still further embodiments, the generating of the quantum cryptography key includes: announcing information to each other through a classical channel connecting the transmitter and the receiver, the information including a part of a measurement result for the composite-quantum-system obtained by each of the transmitter and the receiver; and comparing the announced partial information to generate the quantum cryptography key.

In even further embodiments, the transmitter and the receiver constitute an interferometer providing at least two paths, wherein at least one of paths provided by the interferometer is confined to an inside of the transmitter.

In yet further embodiments, the composite-quantum-system includes the sub-quantum-systems that respectively progress through the paths provided by the interferometer, wherein the quantum cryptography key is generated using an interference phenomenon between the sub-quantum-systems that respectively progress through the paths provided by the interferometer.

In yet further embodiments, the quantum cryptography key is obtained through interference destruction between the sub-quantum-systems, the interference destruction being caused from measurement for the sub-quantum-system.

In yet further embodiments, the transmitter includes first and second quantum detection devices, and the receiver includes a quantum state selection device and a third quantum detection device, wherein the transmitter allows the composite-quantum-system to be in a first quantum state selected randomly by the transmitter, and measures whether a quantum constituting the composite-quantum-system is detected in the first and second quantum detection devices, and the receiver measures whether the sub-quantum-system incident to the receiver is a second quantum state through the quantum state selection device, the second quantum state being selected randomly by the receiver.

In yet further embodiments, a quantum constituting the composite-quantum-system is measured in the second quantum detection device if the first and second quantum states are orthogonal to each other and is measured in one of the first, second, and third quantum detection devices if the first and second quantum states are identical, wherein the quantum cryptography key is generated using a quantum measured in the first quantum detection device.

In yet further embodiments, the quantum is a photon having one polarization state selected randomly among more than two polarization states, and the generating of the quantum cryptography key includes measuring a polarization state of the photon, wherein the measured polarization state of the photon is used for generating the quantum cryptography key or determining whether there is eavesdropping or not.

In other embodiments of the present invention, quantum cryptography systems include: a transmitter and a receiver connected to each other through a quantum channel and a classical channel, wherein the transmitter and the receiver are configured to allow an actual path of a quantum generating a quantum cryptography key not to pass through the quantum channel and to be confined to an inside of the transmitter.

In some embodiments, the transmitter includes a quantum generation device and a quantum detection device, the quantum generation device generating a quantum having one quantum state selected randomly among a plurality of quantum states, the quantum detection device detecting the quantum and its quantum state, wherein the quantum states are used as a bit value for generating the quantum cryptography key.

In other embodiments, the transmitter and the receiver constitute an interferometer providing at least two paths, wherein at least one of paths provided by the interferometer is confined to an inside of the transmitter.

In still other embodiments, the interferometer is the Michelson interferometer or the Mach-Zehnder Interferometer.

In even other embodiments, the interferometer further includes a path length adjustment device for adjusting a difference of a path length between the paths.

In yet other embodiments, at least one of the paths provided by the interferometer extends to the receiver, such that detection probability of the quantum in the transmitter is affected by a measurement procedure for the quantum detection in the receiver.

In further embodiments, the transmitter includes first and second quantum detection devices, and the receiver includes a quantum state selection device and a third quantum detection device, wherein the transmitter makes the quantum be in a first quantum state and is configured to measure whether or not the quantum is detected in the first and second quantum detection devices, the first quantum state being selected randomly by the transmitter; and the receiver is configured to measure whether the quantum incident to the receiver is a second quantum state or not through the quantum state selection device and the third quantum detection device, the second quantum state being randomly selected by the receiver.

In still further embodiments, the second quantum detection device detects the quantum if the first and second quantum states are orthogonal to each other, or detects a quantum travelling through a path confined to the inside of the transmitter if the first and second quantum states are identical, wherein the first quantum detection device is configured to detect a quantum travelling through a path confined to the inside of the transmitter if the first and second quantum states are identical, and the third quantum detection device is configured to detect a quantum going toward the receiver if the first and second quantum states are identical.

In even further embodiments, the quantum state selection device does not change a progressing path of the quantum if the first and second quantum states are orthogonal to each other and allows the quantum to progress toward the third quantum detection device if the first and second quantum states are identical.

In yet further embodiments, the quantum is a photon having one of orthogonal polarization states.

In yet further embodiments, the quantum cryptography system further includes at least one of an error correction device, a privacy amplification device, and an authentication device.

In still other embodiments of the present invention, quantum cryptography systems include: a transmitter including an optical source, a beam splitter, a first reflector, and first and second photon detection devices; and a receiver including a polarization selection device, a second reflector, and a third photon detection device, wherein the optical source, the beam splitter, the first reflector, and the second reflector constitute an interferometer to allow detection probabilities of the photon in the transmitter to be affected by a measurement process for detecting the photon in the receiver.

In some embodiments, the interferometer is configured to provide an inner path and an outer path, the inner path being provided by the beam splitter and the first reflector, the outer path being provided by the beam splitter and the second reflector, wherein the inner path is confined to the inside of the transmitter.

In other embodiments, a progressing path of a photon used for generating a quantum cryptography key does not pass through the outer path and is confined to the inner path.

In still other embodiments, the interferometer further includes a path length adjustment device adjusting a difference of a path length between the outer path and the inner path.

In even other embodiments, the interferometer is the Michelson interferometer or the Mach-Zehnder Interferometer.

In yet other embodiments, the optical source generates a single-photon state or pseudo single-photon state having a first polarization state selected randomly in the transmitter, wherein the polarization selection device does not change a progressing path of the photon if the first and second polarization states are orthogonal and allows the photon to be incident to the third photon detection device when the first and second polarization states are identical, in order to allow the third photon detection device to selectively detect a photon having a second polarization state selected randomly by the receiver.

In further embodiments, the second photon detection device detects the photon if the first and second polarization states are orthogonal to each other; the second photon detection device detects a photon a progressing path confined to the inside of the transmitter if the first and second polarization states are identical, the first photon detection device detects a photon having a progressing path confined to the inside of the transmitter if the first and second polarization states are identical, and the third quantum detection device is configured to detect a photon incident to the receiver if the first and second polarization states are identical.

Advantageous Effects

According to the present invention, when a transmitter Alice and a receiver Bob generate a secret key (a quantum cryptography key), a photon carrying a bit value of the secret key is not actually transmitted through a quantum channel. Accordingly, an eavesdropper cannot access the photon having the secret key value basically and the probability that an eavesdropper is capable of confirming the quantum channel itself is reduced. Therefore, the transmitter Alice and the receiver Bob can safely generate the secret key. Furthermore, according to the present invention, if an eavesdropper eavesdrops by using the photon number splitting (PNS) attack, its eavesdropping attempt can be effectively detected. As a result, the quantum cryptography system and the quantum cryptography key distribution methods can provide excellent network security.

BRIEF DESCRIPTION OF THE DRAWINGS

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIG. 1 is a view illustrating a quantum cryptography system according to the present invention.

BEST MODE FOR CARRYING OUT THE INVENTION

Hereinafter, operating principles of the present invention will be described in more detail with reference to the accompanying drawings such that those skilled in the art can easily realize the technical ideas of the present invention. Moreover, detailed descriptions related to well-known functions or configurations will be ruled out in order not to unnecessarily obscure subject matters of the present invention.

According to the present invention, a composite-quantum-system made of a plurality of sub-quantum-systems can be respectively measured in a transmitter and a receiver, which are connected to each other through a quantum channel. For concise description, a photon is used below is used for an example of a quantized object constituting the quantum-system, but it is apparent that the present invention may be applied to a quantum cryptography system and quantum cryptography key distribution method using other various quantized objects (e.g., electrons, atoms, phonons, etc).

FIG. 1 is a view illustrating a quantum cryptography system 10 according to the present invention.

As illustrated in FIG. 1, the quantum cryptography system 10 includes an optical source 110, an interferometer, a receiver 200, a plurality of photon detectors 160, 170, and 230, and a classical channel 12. The optical source 110 generates an optical pulse signal in a randomly selected polarization state. The interferometer lets optical pulse signals interfere for outputting. The receiver randomly selects a polarization state for measurement as one important function at one side of a path of the interferometer. The photon detectors 160, 170, and 230 detect the photons outputted from the interferometer and their polarization states. The classical channel 12 is used for public discussion required for a post-processing procedure such as error correction and secret amplification. Additionally, the quantum channel 11 constitutes one path (i.e., a path "b") constitutes the quantum channel 11 and the other path (i.e., a path "a") is limited to the inside of the transmitter 100. That is, the path a cannot be basically accessed from the external of the transmitter 100.

On the other hand, each of the photon detectors 160, 170, and 230 of FIG. 1 is configured to detect an incident photon and also measure a polarized state of the incident photon.

Referring to FIG. 1, the transmitter 100 and the receiver 200 are connected via the quantum channel 11 and the classical channel 12. The quantum channel 11 as a communication channel (a core of a quantum cryptography communication) is used for quantum state transmission, and maintains its confidentiality based on a quantum no-cloning theorem. The quantum channel 11 may be realized physically with various methods such as a wire method using an optical fiber and or a wireless method using a free-space. On the other hand, the classical channel 12 is a channel for mutually comparing bases (ex. in the BB84 protocol) that are randomly selected by the transmitter 100 and the receiver 200 or public discussion necessary for a post-processing procedure such as error correction and privacy amplification. Additionally, the classical channel 12 examines an error rate by mutually comparing a portion of a generated secret key, and thus is used for detecting an eavesdropper, or the classical channel 12 is used for authenticating the transmitter 100 and the receiver 200. This classical channel 12 may be realized with a digital optical transmission channel or a conventional wire/wireless communication channel.

The interferometer of the quantum cryptography system 10 of FIG. 1 may be the Michelson interferometer including a beam splitter 130, a first Faraday minor 150, and a second Faraday mirror 220, but the present invention is not necessary limited thereto. For example, the quantum cryptography system of the present invention interferes incident optical pulse signals for outputting by using the Mach-Zehnder Interferometer or other interferometers, and it is apparent to those skilled in the art that its modification can be realized without difficulties.

If a secret key generating mode starts in the quantum cryptography system 10, the optical source 110 in the transmitter 100 generates an optical pulse signal in a randomly selected polarization state. The polarization state is randomly selected to be one of the two orthogonal polarization states such as horizontal polarization "H" and vertical polarization "V". Below, for convenience of description, it is assumed that if the optical pulse signal is the horizontal polarization "H", it represents a bit value 0, and if the optical pulse signal is the vertical polarization "V", it represents a bit value 1.

Additionally, it is assumed that the optical pulse signal is an optical pulse including a single-photon pulse. The optical pulse signal generated in the optical source 110 passes through an optical circulator 120 and then is incident to the beam splitter 130 of the Michelson interferometer. A quantum state after the optical pulse passes through the beam splitter 130 becomes one of two superposition states according to a randomly selected bit value (i.e., a polarization state) as expressed in Equation 1 below.

$$|\phi_0\rangle = \sqrt{T}|0\rangle_a |H\rangle_b + i\sqrt{R}|H\rangle_a |0\rangle_b, |\phi_1\rangle = \sqrt{T}|0\rangle_a |V\rangle_b + i\sqrt{R}|V\rangle_a |0\rangle_b$$ [Equation 1]

Here a quantum state $|\phi_0\rangle$ is a case of when a bit value is 0, and a quantum state $|\phi_1\rangle$ is a case of when a bit value is 1. Additionally, a suffix "a" represents a path toward the first Faraday minor 150 of the transmitter 100 and a suffix "b" represents a path toward the second Faraday mirror 220 of the receiver 200. Moreover, $|H\rangle$ represents a single photon in a horizontal polarization state, $|V\rangle$ represents a single photon in a vertical polarization state, and $|0\rangle$ represents a vacuum state. Furthermore, R represents reflectivity of the beam splitter 130 and T (=1−R) represents transmissivity of the beam splitter 130.

For convenience of description, it will be assumed below that while an optical pulse signal is transmitted through the quantum channel 11, its polarization state is not changed. On the other hand, even if the polarization state is changed while being transmitted, the quantum cryptography system 10 may control a polarization state by using a polarization controller (not shown) in the receiver 200.

The receiver 200 randomly selects one bit value (0 or 1) and then detects an optical pulse signal having a polarization corresponding to the bit value. For example, an optical pulse signal in the horizontal polarization H is measured if the bit value is 0, and an optical pulse signal in the vertical polarization V is measured if the bit value is 1. That is, an optical pulse in the same polarization state as the polarization that is randomly selected from the receiver 200 changes its path by a polarization-selective optical switch 210, and then is detected in the third photon detector 230.

A process for detecting an optical pulse by the polarization-selective optical switch 210 and the third photon detector 230 is as follows. The polarization-selective optical switch 210 changes only a path of a specific polarization component that the receiver 200 selects, and does not change a path of a polarization component orthogonal to the selected polarization. If a polarization state of an optical pulse signal incident to the polarization-selective optical switch 210 is orthogonal to a polarization selected by the receiver 200, the incident optical pulse signal does not change its path in the polarization-selective optical switch 210.

Accordingly, the incident optical pulse signal passes through the polarization-selective optical switch 210 and is reflected by the second Faraday minor 220 and then again passes through the polarization-selective optical switch 210 and returns to the beam splitter 130. On the other hand, if the polarization state of an optical pulse signal incident to the polarization-selective optical switch 210 is identical to the polarization state selected by the receiver 200, the incident optical pulse signal changes its transmission path at the polarization-selective optical switch 210, and thus is detected in the third photon detector 230.

The transmitter 100 may further include an optical delayer 140 as illustrated in FIG. 1. The optical delay 140 is configured to adjust an optical path length difference between paths a and b in order for complete interference in the beam splitter 130. That is, the optical pulse signal incident to the Michelson interferometer is split into two in the beam splitter 130, and then the two signals are transmitted along the paths a and b, respectively. If bit values selected randomly by the transmitter 100 and the receiver 200 are different from each other (i.e., mutually orthogonal polarization states), the two separated optical pulse signals returns from the first and second Faraday minors 150 and 220 and then overlap again in the beam splitter 130. The overlapping optical pulse signals are incident to the second photon detector 170 through the optical circulator 120, due to constructive interference. All the optical pulse signals toward the first photon detector 160 are cancelled out due to destructive interference.

When the two optical pulse signals are respectively reflected from the first and second Faraday minors 150 and 220, its each polarization state changes by 90° (i.e., transformed into its orthogonal polarization). That is, because the two optical pulse signals progress through the same path when being incident to or reflected from the Faraday mirrors 150 and 220, the overlapping two optical pulse signals are in the same polarization state (i.e., in a polarization state orthogonal to the initial incident optical pulse signal) in the beam split 130. The two optical pulse signals progress through the same path when being incident to or reflected from the Faraday mirrors 150 and 220, and only changes its polarization by 90°. Thus, non-linear optical effects caused by a polarization state during transmission are cancelled out each other in an incident path and a reflected path.

As mentioned above, if bit values that are randomly selected by the transmitter 100 and the receiver 200 are different from each other (i.e., orthogonal polarizations), an optical pulse signal incident to the Michelson interferometer is finally detected in the second photon detector 170 with certainty.

On the other hand, if bit values that are randomly selected in the transmitter 100 and the receiver 200 are identical to each other (i.e., identical polarizations), the above-mentioned interference is destroyed. That is, because the receiver 200 measures an optical pulse signal by using the polarization-selective optical switch 210 and the third photon detector 230, "which-path" information of a photon constituting the optical pulse signal is obtained, such that the interference is destroyed. If the interference is destroyed, there are three possibilities described below for the path of the photon.

First, the photon progresses along the path "a" and returns to the beam splitter 130 and then is detected in the first photon detector 160 finally. The probability of this case is RT.

Second, the photon progresses along the path "a" and returns to the beam splitter 130 and then is detected in the second photon detector 170 finally. The probability of this case is $R^2$.

Third, the photon progresses along the path b and changes its path in the polarization-selective optical switch 210 and then is detected in the third photon detector 230. The probability of this case is T.

As mentioned above, the probabilities that a photon is to be detected in the photon detectors 160, 170, and 230 will be summarized as follows in Table 1. For convenience of description, quantum efficiencies of the photon detectors 160, 170, and 230 are assumed to be 1.

TABLE 1

|  | Identical polarizations (interference destroyed) | Orthogonal polarizations (interference maintained) |
| --- | --- | --- |
| First photon detector 160 | Detection probability: RT | Detection probability: 0 |
| Second photon detector 170 | Detection probability: $R^2$ | Detection probability: 1 |
| Third photon detector 230 | Detection probability: T | Detection probability: 0 |

Referring to Table 1, if polarization states selected randomly by the transmitter 100 and the receiver 200 are orthogonal to each other, a photon incident to the interferometer is detected in the second photon detector 170 with certainty (100% accuracy), and when the polarization states are identical to each other, a photon incident to the interferometer is detected finally in the first, second, and third photo detectors 160, 170, and 230 with the respective probabilities of RT, $R^2$, and T.

The polarization state of a photon is measured also in the first, second, and third photo detectors 160, 170, and 230. After a photon constituting an optical pulse signal is finally detected in any of the first, second, and third photo detectors 160, 170, and 230, the transmitter 100 and the receiver 200 announce to each other through the classical channel 12 the information about which photon detector detects the photon.

At this point, if a photon is detected in the second and third photon detectors 170 and 230, all of information about which photon detector detects the photon, information about a polarization state incident to an interferometer, and information about a polarization state detected in the second and third photon detectors 170 and 230 are announced to each other. This is for comparing a polarization state incident to the interferometer with the finally detected polarization state, in other to verify whether the interferometer properly operates or not, and also to detect what kind of eavesdropping attack an eavesdropper tries in the middle of the quantum channel 11.

On the other hand, if a photon incident to the interferometer is detected in the first photon detector 160, only the fact that the photon is detected in the first photon detector 160 is announced but information about its polarization state is not announced. In this case, if the transmitter 100 confirms that a detected polarization state is consistent with the initial polarization incident to the interferometer, the transmitter 100 and the receiver 200 stores a bit value (i.e., the initial polarization), to be used as a secret key later, in bit value storages (not shown). That is, only if the transmitter 100 and the receiver 200 select the same bit value, a photon is detected in the first optical detector 160 with a predetermined probability value.

Accordingly, the transmitter 100 and the receiver 200 know what bit value the opposite side has without informing a randomly selected bit value to the opposite side.

The transmitter 100 and the receiver 200 stores its bit value to be confidential only if a photon is detected in the first photon detector 160, and in other cases, its bit values are discarded. By repeating these processes, the transmitter 100 and the receiver 200 may obtain a bit string having a plurality of bit values stored in respective positioned bit value storages (not shown). Hereinafter, this bit string will be called as a "sifted key".

The transmitter 100 and the receiver 200 announce a part of bit values of the obtained sifted key to each other through the classical channel 12, and detects what kind of eavesdropping attack an eavesdropper tries by examining an error rate and a generation speed of the sifted key. Likewise, a part of bit values of the sifted key open to each other is discarded later without using it as a secret key.

On the other hand, the remaining unannounced bit values except for the open part of bit values among the sifted key stored in the transmitter 100 and the receiver 200 undergo a post-processing procedure such as error correction, privacy amplification and then finally becomes a secret key. The finally generated secret key is stored in each of the transmitter 100 and the receiver 200 and then will be used for various purposes, such as for encoding/decoding data to be provide communication securities, authentications, etc.

In the case that a bit value, which is randomly selected in the transmitter 100 and the receiver 200, is used as a secret key later, a photon constituting an optical pulse signal incident to the interferometer progresses along the path "a" and returns to the beam splitter 130 after being reflected from the first Faraday mirror 150, and then is finally detected in the first photon detector 160. At this point, the photon stays in the transmitter 100 during the previous process. That is, the photon is not actually transmitted to the receiver 200 through the quantum channel 11, but the transmitter 100 and the receiver 200 of the quantum cryptography system 10 recognize that the randomly selected private bit values are identical to each other. Accordingly, while each of bit values constituting a secret key is generated, a photon containing secret bit value information is not actually transmitted through the quantum channel 11 in the quantum cryptography system 10. Such that excellent security can be achieved.

In a typical quantum cryptography system, a photon containing secret key information is actually transmitted through a quantum channel. Therefore, an eavesdropper can access the photon transmitted through a quantum channel and then obtain certain information. On the contrary, it is impossible for an eavesdropper to directly access a photon containing secret key information in the quantum cryptography system 10 of the present invention. Accordingly, an amount of information that an eavesdropper can obtain about a secret key is drastically reduced.

On the other hand, if a polarization state selected in the transmitter 100 of the quantum cryptography system 10 is identical to a polarization state selected in the receiver 200, the probability that a bit value constituting a sifted key is generated is RT per each one photon incident to the interferometer. Therefore, a sifted key generation probability becomes the maximum when $R=T=1/2$. At this point, the sifted key generation probability is $RT=1/4$. On the other hand, R and T value may be appropriately controlled according to a usage environment.

In the quantum cryptography system 10, a secret key can be generated even though any photon carrying secret information is not in fact transmitted through a quantum channel. Accordingly, the probability that an eavesdropper can confirm a quantum channel itself is limited. That is, in the typical quantum cryptography system, if an eavesdropper tries to accurately confirm a quantum channel, it can be done with 100% efficiency, but according to the present invention, its efficiency is reduced to $(2-R)/(2+R)$.

Additionally, if an eavesdropper tries to accurately confirm a quantum channel in a typical quantum cryptography system, he/she is not detected at all. On the contrary, an action of an eavesdropper for accurately confirming a quantum channel in the quantum cryptography system 10 of the present invention has a probability RT of causing a bit error such that his/her action can be effectively detected.

On the other hand, according to the present invention, even if an eavesdropper eavesdrops using a photon number splitting (PNS) attack, his/her eavesdropping can be effectively detected. That is, the eavesdropper needs to measure the number of photons transmitted through a quantum channel in order to perform PNS attack. The measuring of the number of photons allows an eavesdropper to obtain "which-path" information of a photon such that the above-mentioned interference is destroyed. Therefore, if an eavesdropper eavesdrops through PNS attack, bit errors occur and also the transmitter 100 and the receiver 200 can detect the bit errors and eavesdropping attempts.

On the other hand, the polarization states of the present invention are not necessarily limited to two orthogonal polarization states, such as a horizontal polarization H and a vertical polarization V. That is, it is apparent to those skilled in the art that the present invention may use four polarization states such as in the BB84 protocol, two non-orthogonal polarization states such as in the B92 protocol, six polarization states, or another polarization state representing a bit value. A quantum cryptography method using the six polarization states are disclosed in a paper (Dagmar Bruβ et. al., Physical Review Letters, 1998, pp. 3018-3021) titled "Optimal Eavesdropping in Quantum Cryptography with Six States".

Furthermore, an optical pulse signal used in the present invention may not be necessarily limited to an optical pulse including a single-photon. That is, it is apparent to those skilled in the art that the optical pulse signal can be realized using a weak coherent light, a pseudo single-photon state, or an optical pulse having other photon statistics.

Moreover, the first and second Faraday minors 150 and 220 may be generally realized with a conventional optical mirror.

Furthermore, the quantum channel 11 and the optical paths may be generally realized with an optical fiber, an optical waveguide, or a free-space.

Hereinafter, a secret key distribution method of the quantum cryptography system according to the present invention will be described in another aspect.

Once a secret key generating mode starts in the quantum cryptography system including a transmitter and a receiver connected to each other through a quantum channel and a classical channel, the transmitter generates a composite-quantum-system made of a plurality of sub-quantum-system. The composite-quantum-system is in a quantum state that is randomly selected by the transmitter among at least two quantum states, and each of the selected quantum states represents a bit value for generating a secrete key (a quantum cryptography key). The transmitter confines a part of the sub-quantum-systems therein in order not to expose the entire composite-quantum-system to the outside, and configures the composite-quantum-system in such a way that it is impossible to determine the composite-quantum-system at the outside without disturbing the composite-quantum-system.

For convenience of description, we assume that the composite-quantum-system is composed of two sub-quantum-systems (i.e., a sub-quantum-system A and a sub-quantum-system B), and additionally, the composite-quantum-system is generated to be in one quantum state that is randomly selected among the two orthogonal quantum states. A density matrix of the composite-quantum-system AB is indicated as $\rho_S(AB)$. Here, the suffix "s" represents one quantum state that is randomly selected among the two orthogonal quantum states. If a bit value 0 is randomly selected, $s=0$, and if the bit value 1 is randomly selected, $s=1$.

The transmitter confines the sub-quantum-system A therein, and exposes the sub-quantum-system B to the receiver through a quantum channel. That is, a reduced density matrix of the sub-quantum-system B that can be accessed at the outside of the transmitter can be expressed as Equation 2 below.

$$\rho_S(B) = Tr_A[\rho_S(AB)] \quad \text{[Equation 2]}$$

Here, according to a no-cloning principle, if $\rho_0(B)$ and $\rho_1(B)$ are non-orthogonal, it is impossible to determine the composite-quantum-system without disturbing the composite-quantum-system AB at the outside of the transmitter.

That is, the transmitter generates the composite-quantum-system AB in such a way that $\rho_0(B)$ and $\rho_1(B)$ are non-orthogonal, and confines the sub-quantum-system A therein. The transmitter exposes the sub-quantum-system B to the receiver through a quantum channel. The receiver performs an appropriate measurement on the sub-quantum-system B.

According to the measurement performed at the receiver, the composite-quantum-system AB is disturbed. The transmitter performs an appropriate measurement on the disturbed composite-quantum-system. The transmitter and the receiver announce a part of information of the measurement results to each other through a classical channel. The transmitter and the receiver compare the respectively announced information and then generate a quantum cryptography key. At this point, only if an actual path of a quantum constituting the composite-quantum-system is limited to the inside of the transmitter, the quantum is selected to be used for generating a quantum cryptography key.

On the other hand, if an eavesdropper eavesdrops at the outside of the transmitter to determine which quantum state the composite-quantum-system has (i.e., whether s=0 or s=1), the composite-quantum-system is disturbed, thereby causing bit errors in the quantum cryptography key. Therefore, the transmitter and the receiver can determine whether there is an eavesdropper or not by examining the bit errors.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A distribution method of a quantum cryptography key, the method comprising:
   generating, by a transmitter, a composite-quantum-system including first and second sub-quantum-systems;
   transmitting, by the transmitter, the second sub-quantum-system to a receiver that is connected to the transmitter through a quantum channel;
   measuring, by the receiver, the second sub-quantum-system;
   measuring, by the transmitter, the composite-quantum-system that is disturbed according to the measurement performed by the receiver;
   generating, by the transmitter and the receiver, the quantum cryptography key based on results of the measurements performed by the transmitter and the receiver,
   wherein the first sub-quantum-system is confined within the transmitter, and the composite-quantum-system is not determined at the outside of the transmitter without disturbing the composite-quantum-system, and
   wherein the generating of the quantum cryptography key comprises:
      announcing, by the transmitter and the receiver, information on the measurement results to each other through a classical channel connecting the transmitter and the receiver, the information including a part of the measurement results obtained by the transmitter and the receiver; and
      comparing the announced information to generate the quantum cryptography key.

2. The method of claim 1, wherein an actual path of a quantized object comprising the composite-quantum-system and used to generate the quantum cryptography key is confined in the transmitter.

3. The method of claim 1, wherein the composite-quantum-system has a quantum state selected among more than two quantum states, and the selected quantum state is used as a bit value for generating the quantum cryptography key.

4. The method of claim 1, wherein the composite-quantum-system has a quantum state selected among orthogonal quantum states.

5. The method of claim 1, wherein the transmitter and the receiver comprise an interferometer providing at least two paths,
   wherein at least one of paths provided by the interferometer is confined in the transmitter.

6. The method of claim 5, wherein the sub-quantum-systems of the composite-quantum-system progress through the paths provided by the interferometer, and
   wherein the quantum cryptography key is generated using an interference phenomenon between the sub-quantum-systems that progress through the paths.

7. The method of claim 6, wherein the quantum cryptography key is obtained through interference destruction between the sub-quantum-systems, the interference destruction being caused by the measurement of the sub-quantum-systems.

8. The method of claim 1, wherein the transmitter comprises first and second quantum detection devices, and the receiver comprises a quantum state selection device and a third quantum detection device,
   wherein the transmitter generates the composite-quantum-system in a first quantum state, and detects whether the quantized object comprising the composite-quantum-system is detected by the first and second quantum detection devices, and
   wherein the receiver measures whether or not the second sub-quantum-system incident to the receiver is in a second quantum state using the quantum state selection device, the second quantum state being selected by the receiver.

9. The method of claim 8, wherein the quantized object comprising the composite-quantum-system is measured in the second quantum detection device if the first and second quantum states are orthogonal to each other, and is measured in one of the first, second, and third quantum detection devices if the first and second quantum states are identical to each other,
   wherein the quantum cryptography key is generated when the quantized object is detected by the first quantum detection device.

10. The method of claim 1, wherein the quantized object is a photon having one polarization state selected among more than two polarization states, and the generating of the quantum cryptography key comprises measuring the polarization state of the photon, wherein the measured polarization state of the photon is used for generating the quantum cryptography key or determining whether there is eavesdropping or not.

11. A quantum cryptography system, comprising:
a transmitter and a receiver connected to each other through a quantum channel and a classical channel,
wherein the transmitter comprises first and second quantum detection devices, and the receiver comprises a quantum state selection device and a third quantum detection device,
wherein the transmitter is configured to generate a quantized object in a first quantum state and to measure whether or not the quantized object is detected in the first or second quantum detection devices, the first quantum state of the quantized object being selected by the transmitter,
wherein the receiver is configured to detect whether or not a quantized object incident to the receiver is in a second quantum state using the quantum state selection device, the second quantum state being selected by the receiver, and
wherein a quantized object used to generate a quantum cryptography key does not pass through the quantum channel and is confined in the transmitter.

12. The quantum cryptography system of claim 11, wherein the transmitter further comprises:
a quantum generation device configured to generate the quantized object having the first quantum state selected among a plurality of quantum states,
wherein the first quantum state of the quantized object is used as a bit value for generating the quantum cryptography key.

13. The quantum cryptography system of claim 11, wherein the transmitter and the receiver comprise an interferometer providing at least two paths,
wherein at least one of the paths provided by the interferometer is confined in the transmitter.

14. The quantum cryptography system of claim 13, wherein the interferometer is a Michelson interferometer or a Mach-Zehnder Interferometer.

15. The quantum cryptography system of claim 13, wherein the interferometer further comprises a path length adjustment device configured to adjust a path length difference between the paths.

16. The quantum cryptography system of claim 13, wherein at least one of the paths provided by the interferometer extends to the receiver, such that a detection probability of the quantized object in the transmitter is affected by a measurement procedure for quantum detection in the receiver.

17. The quantum cryptography system of claim 11, wherein the second quantum detection device is configured to detect the quantized object if the first and second quantum states are orthogonal to each other and detect a quantized object having a progressing path confined in the transmitter if the first and second quantum states are identical to each other,
wherein the first quantum detection device is configured to detect the quantized object having the progressing path confined in the transmitter if the first and second quantum states are identical to each other, and
wherein the third quantum detection device is configured to detect a quantized object having a progressing path toward the receiver if the first and second quantum states are identical to each other.

18. The quantum cryptography system of claim 11, wherein the quantum state selection device does not change a progressing path of the quantized object incident to the receiver if the first and second quantum states are orthogonal to each other and allows the quantized object incident to the receiver to progress toward the third quantum detection device if the first and second quantum states are identical to each other.

19. The quantum cryptography system of claim 11, wherein the quantized object is a photon having one of orthogonal polarization states.

20. The quantum cryptography system of claim 11, wherein the quantum cryptography system further comprises at least one of an error correction device, a privacy amplification device, and an authentication device.

21. A quantum cryptography system, comprising:
a transmitter including an optical source, a beam splitter, a first reflector, and first and second photon detection devices; and
a receiver including a polarization selection device, a second reflector, and a third photon detection device,
wherein the optical source, the beam splitter, the first reflector, and the second reflector comprise an interferometer to allow detection probabilities of a photon in the transmitter to be affected by a measurement process for detecting a photon in the receiver, and
wherein the transmitter and the receiver announce information on results of the measurement process to each other through a classical channel connecting the transmitter and the receiver, the announced information including a part of the measurement results obtained by the transmitter and the receiver, and the announced information is compared to generate a quantum cryptography key.

22. The quantum cryptography system of claim 21, wherein the interferometer is configured to provide an inner path disposed in the transmitter and an outer path disposed between the transmitter and the receiver, the inner path being provided by the beam splitter and the first reflector, the outer path being provided by the beam splitter and the second reflector,
wherein the inner path is confined in the transmitter.

23. The quantum cryptography system of claim 22, wherein a photon used for generating the quantum cryptography key passes through the inner path.

24. The quantum cryptography system of claim 22, wherein the interferometer further comprises a path length adjustment device configured to adjust a path length difference between the outer path and the inner path.

25. The quantum cryptography system of claim 21, wherein the interferometer is a Michelson interferometer or a Mach-Zehnder Interferometer.

26. The quantum cryptography system of claim 21, wherein the optical source is configured to generate a single-photon or a pseudo single-photon having a first polarization state selected by the transmitter,
wherein the polarization selection device does not change a progressing path of the photon if the first polarization state is orthogonal to a second polarization state selected by the receiver and allows the photon to be incident to the third photon detection device when the first and second polarization states are identical to each other, the third photon detection device detecting the photon having the second polarization state.

27. The quantum cryptography system of claim 21, wherein the second photon detection device is configured to detect the photon if a first polarization state selected by the transmitter is orthogonal to a second polarization state selected by the receiver, wherein the second photon detection device is configured to detect a photon having a progressing path confined in the transmitter if the first and second polarization states are identical to each other, wherein the first photon detection device is configured to detect the photon having a progressing path confined in the transmitter if the first and second polarization states are identical to each other, and wherein the third quantum detection device is configured to detect a photon incident to the receiver if the first and second polarization states are identical to each other.

* * * * *